M. C. SCHWAB.
CIGAR LIGHTER FOR ATTACHMENT TO AUTOMOBILES AND THE LIKE.
APPLICATION FILED MAR. 24, 1913.
1,121,539.
Patented Dec. 15, 1914.
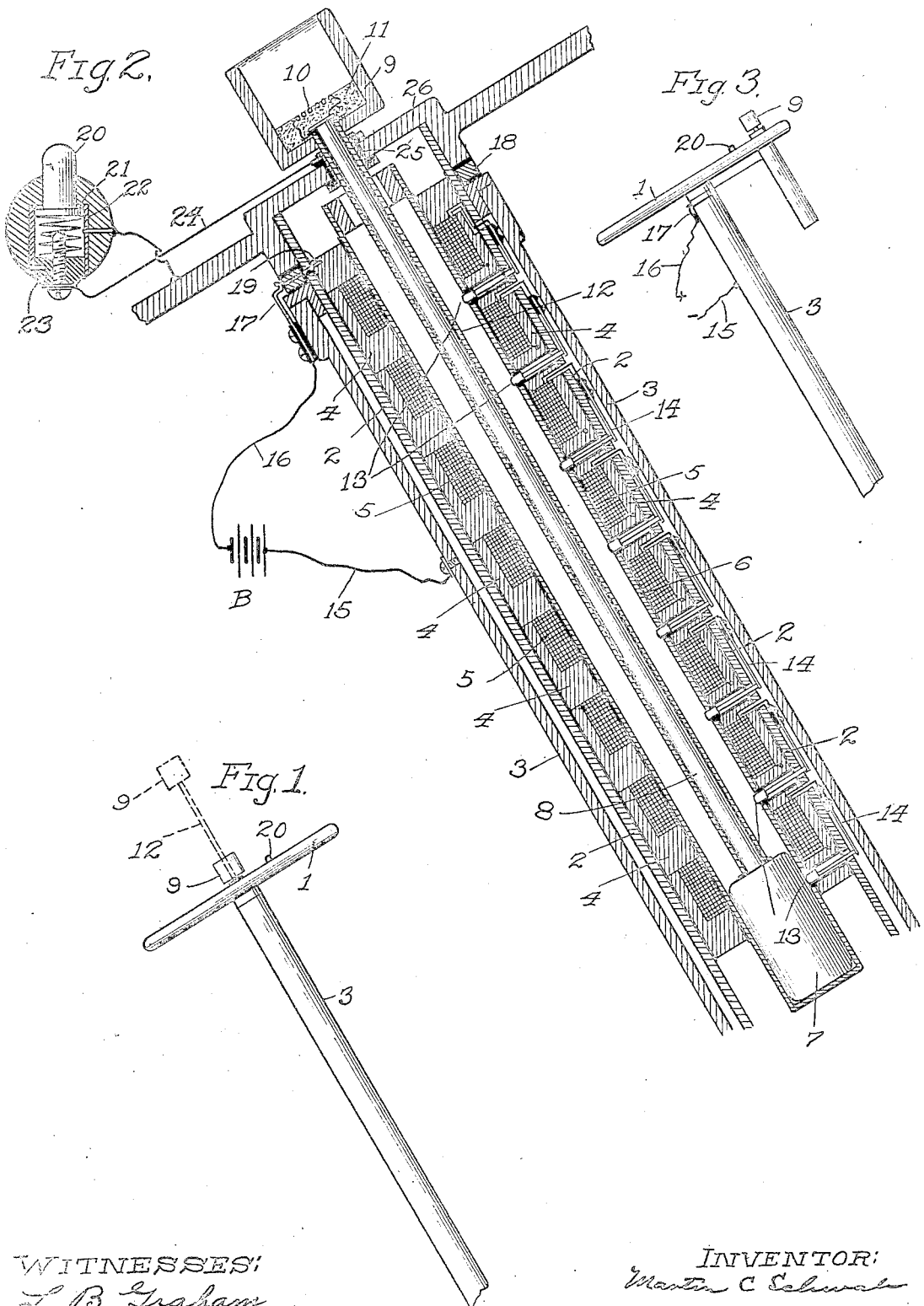
WITNESSES:
L. B. Graham
Milton Lenoir
INVENTOR:
Martin C Schwab
By
Atty.

UNITED STATES PATENT OFFICE.

MARTIN C. SCHWAB, OF CHICAGO, ILLINOIS.

CIGAR-LIGHTER FOR ATTACHMENT TO AUTOMOBILES AND THE LIKE.

1,121,539.

Specification of Letters Patent.

Patented Dec. 15, 1914.

Application filed March 24, 1913. Serial No. 756,392.

*To all whom it may concern:*

Be it known that I, MARTIN C. SCHWAB, a citizen of the United States, residing at Chicago, in the county of Cook and State of Illinois, have invented certain new and useful Improvements in Cigar-Lighters for Attachment to Automobiles and the like, of which the following is a specification.

My chief aim and object is to provide a cigar lighter which is particularly adapted for attachment to automobiles and other vehicles and which will enable the driver or operator to conveniently light his cigar without removing his hands, or, in fact, either of them, from the steering wheel or other steering device so as to leave it free to move at random; and while, as stated, my chief aim is to provide a cigar lighter of this character for use on automobiles, still it is to be understood that a cigar lighter constructed in accordance with the invention may be used in other situations where it is desirable to withdraw the lighter so that it will be out of the way when not in actual use.

With these things in view one object of the invention, broadly stated, is to provide a cigar lighter having an igniter and a movable carrier therefor, suitable mechanism being provided for so moving the carrier that it will be automatically retracted and the igniter drawn into an out-of-the-way position or situation.

A minor object of the invention is to associate a lighter having these characteristics with the steering wheel or other steering device of an automobile or the like.

Still another minor object of the invention is to accomplish the retracting of the igniter and its carrier automatically; and still a further minor object of the invention is to provide electrically operated mechanism whereby all of the several operations or steps of the operation in carrying the invention into effect may be brought about by the simple act of operating a push button.

To these ends the invention, in its broadest aspect, consists in a cigar lighter having an igniter of such character that it will give out sufficient heat to light a cigar, a carrier for said igniter, means for projecting the carrier so as to bring the igniter into position for convenient reach by the end of a cigar held in the mouth and means for retracting the carrier when the lighter is not in actual use and storing it in an out of the way place.

The invention consists also in the features of novelty that are hereinafter described with reference to the accompanying drawing which is made a part of this specification and in which—

Figure 1 is an elevation on a small scale of the steering wheel of an automobile, and its accessories, showing the relation thereto of one of the improved cigar lighters. Fig. 2 is an enlarged sectional elevation of a cigar lighter embodying the invention, the section being taken in an axial plane of the steering wheel.

The steering wheel of an automobile is represented by the numeral 1. So far as the present invention is concerned, it may be of customary construction and connected with the steering wheels of the car by any suitable means. As shown in the drawing it is non-rotatively secured to a hollow or tubular shaft, 2, which is contained within an outer tubular shell or casing, 3, by which it is sustained laterally. The hollow shaft, 2, constitutes in effect and in fact the outer shell or casing of an electromagnet having any desired number of pole pieces, 4, and coils, 5, all of the pole pieces being in electrical connection, as through the tube 2, or otherwise, while each of the several coils is separate and complete in itself. The several coils are arranged around a tube, 6, by which they are held intact and which forms a guide for an armature, 7, which is common to all of the electric magnets thus formed. Assuming the bore of the tube, 6, to be circular the armature, 7, is cylindrical, so that it may slide freely therein and be guided thereby. The armature carries a rod or stem, 8, and this rod in turn carries at its upper end a cup, 9, in which is arranged the igniter, or lighter proper, which, in the instance shown in the drawing consists of a coil, 10, of platinum wire, which rests upon or is embedded in a body, 11, which may be of asbestos or other non-conducting material. One end of the coil, 10, which is in fact the igniter and adapted when electrically charged to throw off sufficient heat to light the end of a cigar, is electrically connected with the rod, 8, which is surrounded by an insulated sleeve, 12, made of conducting material. The rod is electrically connected with the armature 7, and the armature is adapted to contact in succession with a series of spring-pressed pins, 13, each of which is electrically connected with one end of one of the coils, 5, by any suitable means, as, for example, through insulated plate springs, 14, or any other suitable insulated electric conductor, there being one of these spring-pressed pins, electrically connected up as just described for each of the coils. The end of the coil opposite the connection 14 is in electrical connection with the battery B, and this electrical connection may be accomplished in any desired manner. In the drawing, one pole of the battery is shown as being connected with the tubular shell, 3, by a conductor, 15, while the other pole is connected by a conductor 16, with a spring contact 17, which bears constantly against the periphery of an insulated ring, 18, carried by the hollow steering tube, 2, the ring 18 being electrically connected with one of the several pole pieces, 4, by an insulated conductor, 19.

A push button, 20, is secured to some part of the steering wheel, 1, so as to be within convenient reach of the driver. One member, 21, of the push button has electrical contact with an insulated containing shell, 22, while the other member, 23, has electrical connection through a conductor, 24, with a conducting sleeve, 25, passing through a central opening through the hub, 26, of the steering wheel, and suitably insulated therefrom, said sleeve, 25, being in electrical connection with the insulated sleeve 12. The insulated containing shell, 22, is electrically connected with the steering wheel through a conductor, 27, or is otherwise electrically connected therewith.

With this arrangement, when the movable member 21 of the push button is forced down the circuit from the battery is closed through all of the several coils of the electromagnet in succession, as will appear hereinafter and also through the igniting coil, 10. As the result of the closing of the circuit through the coils of the electromagnet, the armature, 7, will be attracted and moved in the direction that forces the rod 8 out and away from the electromagnet and this causes the rod 8 to project from the upper end of the steering tube, or above the steering wheel, far enough to bring the carrier 9 within convenient reach so that the driver may light a cigar by inserting its end in the shielding cup, 9, and producing a draft through it while its end is in contact with the igniter 10, in the customary manner, all without the necessity for removing either or both of his hands from the steering wheel.

The foregoing description contemplates more especially the concentric location and arrangement of the axis of the steering wheel and the longitudinal movement of the carrier which supports the igniter, and while this is practicable and preferred, still I desire to have it understood that the several novel features may be embodied in a lighter which is adapted to be attached to the steering wheel or other part of an automobile already constructed, without requiring any alteration whatever in its steering mechanism, and it is with a view to illustrating this particular use of the invention that Fig. 3 is added to the drawing.

In the foregoing description electrical appliances have been described for bringing about all of the several operations, but I believe myself to be the first to provide a cigar lighter having means adapted to so operate as to accomplish the several objects at which the invention aims, regardless of the details of construction or of the character of the mechanism, whether mechanical or electrical either in whole or in part. I therefore desire to have it understood that I reserve to myself the exclusive right to use any or all of the several features of novelty that are herein described in any manner and in any situation in which they may be found to be used.

It will be observed that the means above described and shown in the drawing for moving the igniter in position for convenient use amounts to a series of solenoids which are successively energized, but it is manifest that excepting where the extent of movement of the igniter carrier or other practical connections make it impracticable, the solenoid may have only a single coil.

What I claim as new and desire to secure by Letters Patent is:

1. A cigar lighter having, in combination, an igniter having the property of being raised to incandescence by the action of the current of electricity passing through it, a movable carrier therefor, electromagnetic means for projecting the carrier to bring the igniter into position for convenient use and means for guiding the carrier in its movements.

2. A cigar lighter having, in combination, an igniter, a movable carrier therefor, and a solenoid for projecting the carrier to bring the igniter into position for convenient use.

3. A cigar lighter having, in combination, an igniter having the property of being raised to incandescence by the action of a current of electricity passing through it, a movable carrier for said igniter, a solenoid arranged in operative relation to the carrier for projecting it to bring the igniter into position for convenient use, an open circuit including the coil of the solenoid and the igniter and a push button having contacts also included in said circuit and adapted to close it and thereby simultaneously cause the current to excite the solenoid and the igniter.

4. A cigar lighter having, in combination, an igniter made of material of low electric conductivity adapted when electrically excited to become incandescent, a movable carrier for the igniter, electromagnetic means for moving said carrier to bring the igniter into position for convenient use, and means for guiding the carrier in its movements.

5. A cigar lighter having, in combination, an igniter having the property of being raised to incandescence by the action of the current of electricity passing through it, a movable carrier therefor having a longitudinally movable stem, a tube into which said stem projects and is movable endwise and electromagnetic means for moving the stem endwise to project it beyond the end of the tube and carry the igniter into position for convenient use.

6. A cigar lighter having in combination, an igniter having the property of being raised to incandescence by the action of the current of electricity passing through it, a carrier therefor having a longitudinally movable stem, an upright tube into the upper end of which said stem projects with a loose fit so that it is freely movable therein endwise, and means for moving the stem upward to project it from the upper end of the tube and carry the igniter into position for convenient use, the stem being free to recede into the tube by the action of gravity.

MARTIN C. SCHWAB.

Witnesses:
  E. V. STACK,
  L. M. HOPKINS.